US005544404A

United States Patent [19]
Brunnhofer

[11] Patent Number: 5,544,404
[45] Date of Patent: Aug. 13, 1996

[54] METHOD OF INSTALLING A MOTOR-VEHICLE TUBE ASSEMBLY

[75] Inventor: Erwin Brunnhofer, Fuldabrück, Germany

[73] Assignee: Technoflow Tube-Systems GmbH, Fuldabruck, Germany

[21] Appl. No.: 376,370

[22] Filed: Jan. 23, 1995

[30] Foreign Application Priority Data

Feb. 17, 1994 [DE] Germany .......................... 44 04 879.3

[51] Int. Cl.⁶ ............................................... B21D 39/03
[52] U.S. Cl. ................................. 29/430; 29/445
[58] Field of Search ........................... 29/430, 771, 783, 29/791, 445; 72/369

[56] References Cited

U.S. PATENT DOCUMENTS 3,874,048  4/1975  Millar et al. ........................ 29/430

4,991,282  2/1991  Konig ................................. 29/430

FOREIGN PATENT DOCUMENTS 3729084  3/1989  Germany ............................. 29/791

*Primary Examiner*—David P. Bryant
*Attorney, Agent, or Firm*—Herbert Dubno; Andrew Wilford

[57]    ABSTRACT

A motor vehicle having fluid-using elements is moved as it is being made past a station. An assembly is delivered to the station having a plurality of substantially straight and longitudinally extending tubes having ends, respective fittings on the ends adapted to be secured to the elements of the vehicle, and transverse cleats laterally interconnecting the tubes into the assembly. At least some of the tubes are bent at the assembly station. The assembly with the bent tubes is then fitted to the vehicle at the station and the fittings are secured to the respective elements. Then at least one of the cleats is secured to the vehicle to fasten the assembly in place.

6 Claims, 6 Drawing Sheets

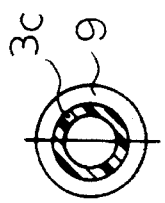
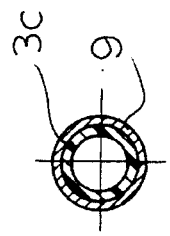
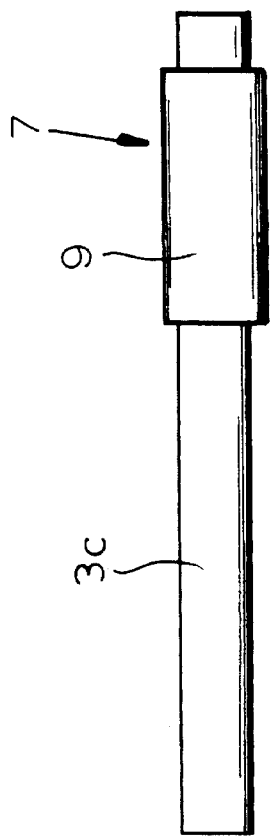
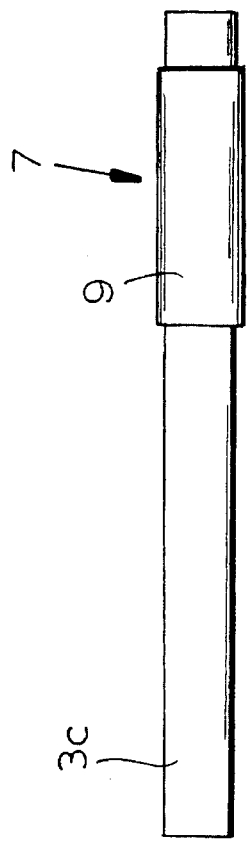
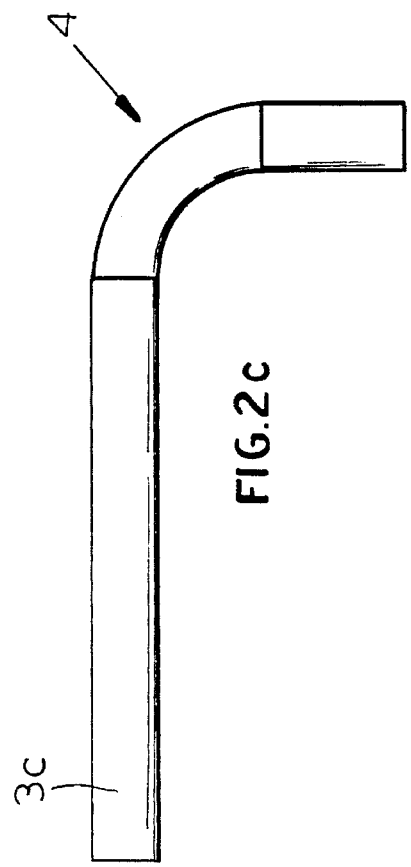

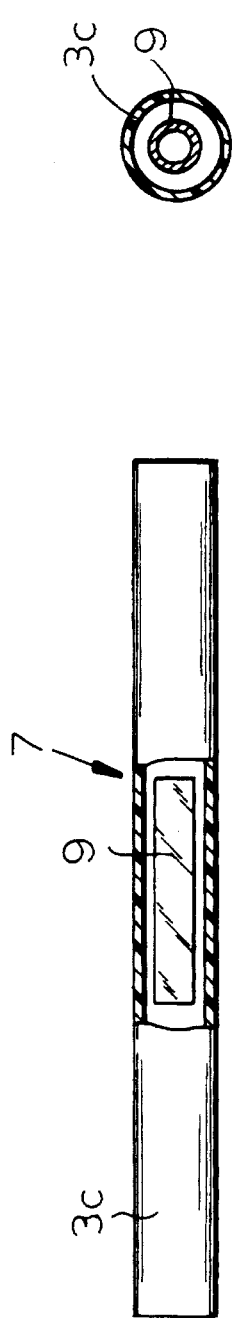
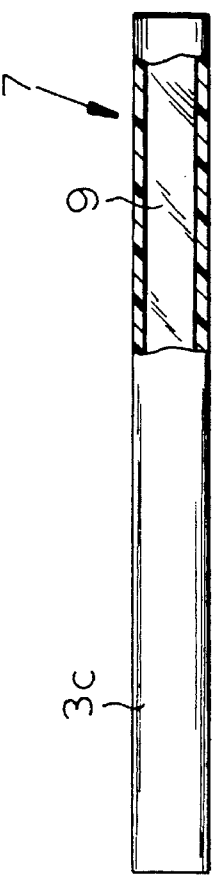
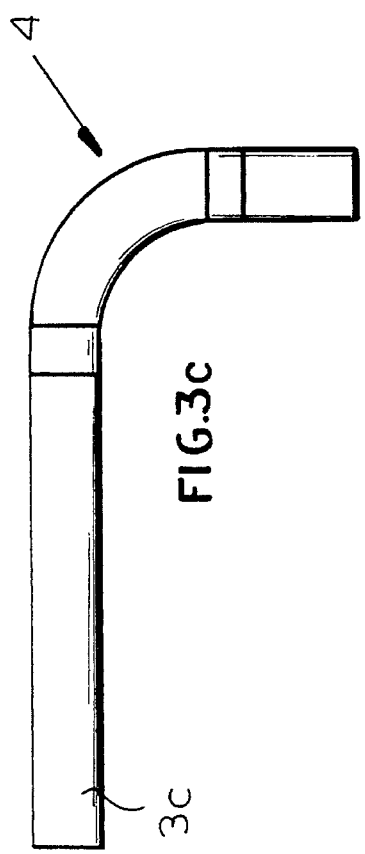

METHOD OF INSTALLING A MOTOR-VEHICLE TUBE ASSEMBLY

FIELD OF THE INVENTION

The present invention relates to a tube assembly for installation in a motor vehicle. More particularly this invention concerns an assembly of brake, fuel, and similar tubes and a method of installing it in a motor vehicle.

BACKGROUND OF THE INVENTION

Today's motor vehicles typically have a plurality of subsystems that use fluids. The hydraulic or air brakes, the air-conditioner, the fuel system, the windshield washers, the coolant system, even hydraulically or pneumatically operated seat adjusters and lock systems rely on small-diameter tubes which conduct the various fluids and gases throughout the vehicle. The tubes for the brake and fuel systems, in particular, must run from the front to the back of the vehicle.

As a rule these tubes are manufactured by a subcontractor who supplies them to the assembly plant ready to use. Thus each tube has a predetermined rectified length, is provided at its ends with fittings that are matched to the various fluid-using elements of the vehicle that the tube is to be attached to. As the vehicle moves along its assembly line, it passes a station where the tubes are fitted to it and secured to the body of the vehicle by appropriate clips.

The tubes are extremely bulky and hard-to-handle prior to installation. They are often bent into three-dimensional shapes that are difficult to handle and they are relatively fragile, so that a certain percentage is damaged prior to installation. Some of the tubes are inevitably kinked and rendered unusable, in particular the light-duty and plastic ones. To simplify the situation it is known to provide mainly straight tubes that are fitted with short bent sections at their ends so they can be connected to the fluid-using elements of the vehicle, but this solution is expensive and adds another potential leak site to the tube.

OBJECTS OF THE INVENTION

It is therefore an object of the present invention to provide an improved tube assembly and method of installing it.

Another object is the provision of such an improved tube assembly and method of installing it in a motor vehicle which overcomes the above-given disadvantages, that is which is inexpensive and easy to install.

SUMMARY OF THE INVENTION

The instant invention is an improvement in a method of manufacturing a motor vehicle having fluid-using elements where the vehicle is moved as it is being made past a station. According to the invention an assembly is delivered to the station having a plurality of substantially straight and longitudinally extending tubes having ends, respective fittings on the ends adapted to be secured to the elements of the vehicle, and transverse cleats laterally interconnecting the tubes into the assembly. At least some of the tubes are bent at the assembly station. The assembly with the bent tubes is then fitted to the vehicle at the station and the fittings are secured to the respective elements. Then at least one of the cleats is secured to the vehicle to fasten the assembly in place.

In accordance with a further feature of this invention prior to being plastically bent the tubes of the assembly are centered on substantially parallel and coplanar axes. Thus each assembly is a basically flat, effectively one-piece unit that can be stacked and even shipped in stacks. The assemblies are very easy to handle and take up relatively little space, compared to the bulky three-dimensional prebent tubes normally used. The tube-installing station is provided with a table that has a holder adapted to fit with positioning formations on the assembly and that also has a plurality of benders programmed to bend the individual tubes to the desired extent. Thus the station worker drops a fresh assembly onto the table in the desired position, it is clamped and bent automatically to the exact shape for the car in question. Then the bent assembly is applied to the passing car as a single custom-made unit. The bending machine is loaded and operates synchronously as the vehicles pass.

In accordance with a feature of this invention at least one of the tubes is made of elastically deformable plastic and is provided at a bend location with a sleeve of plastically deformable metal that is subsequently plastically bent. This sleeve can be mounted outside or inside the one tube. The tube can have an accordioned region facilitating bending.

To ensure that the assembly is rigid and easy to handle, at least one of the tubes is made of metal and is rigid. Normally the brake lines in a motor vehicle, which are subjected to considerable internal pressure, are made of metal and can be used to reinforce the normally plastic fuel feed, vent, and return lines.

BRIEF DESCRIPTION OF THE DRAWING

The above and other objects, features, and advantages will become more readily apparent from the following description, reference being made to the accompanying drawing in which:

FIGS. 2a through 2e are side and end views of parts of a tube according to the invention;

FIGS. 3a through 3e are views like FIGS. 2a–2e of another tube according to the invention.

SPECIFIC DESCRIPTION

Figure 1:
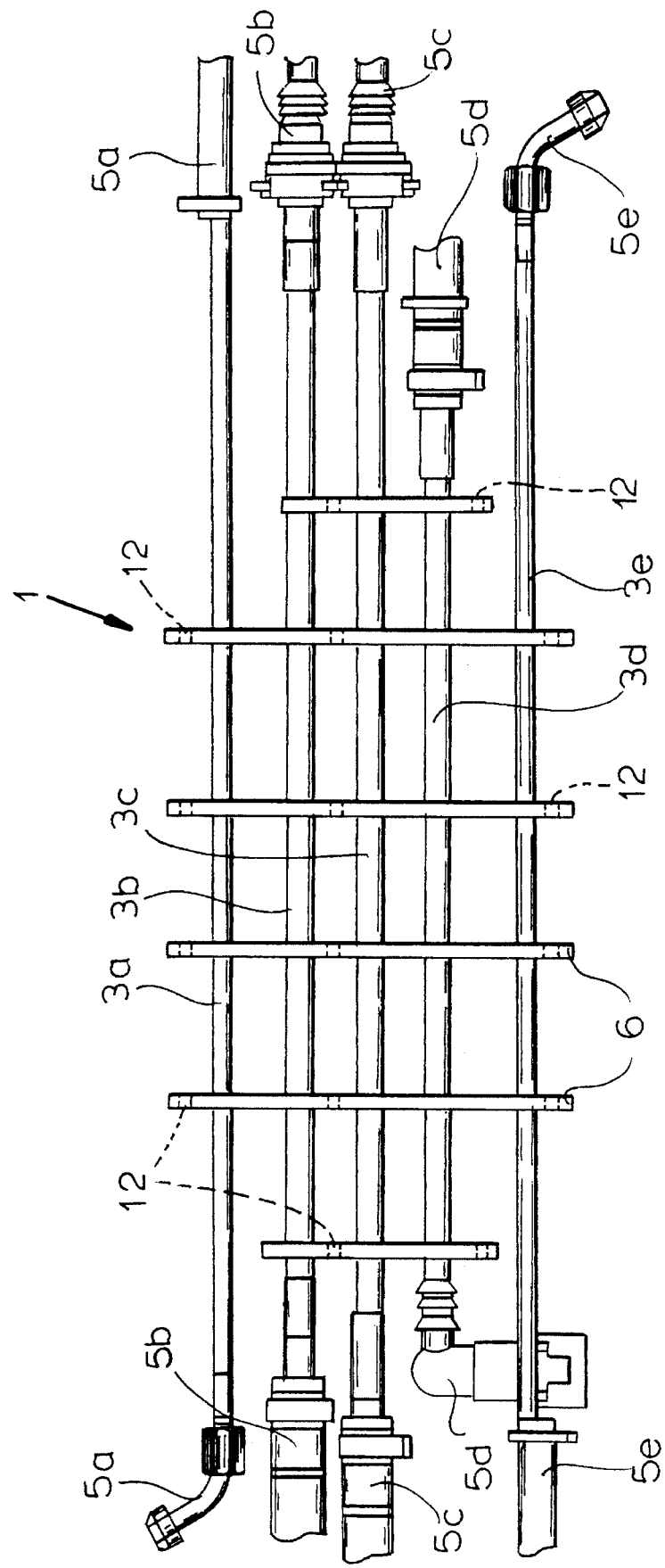
FIG. 1 is a small-scale view of a tube assembly according to the invention as received from its manufacturer.
Figure 5:
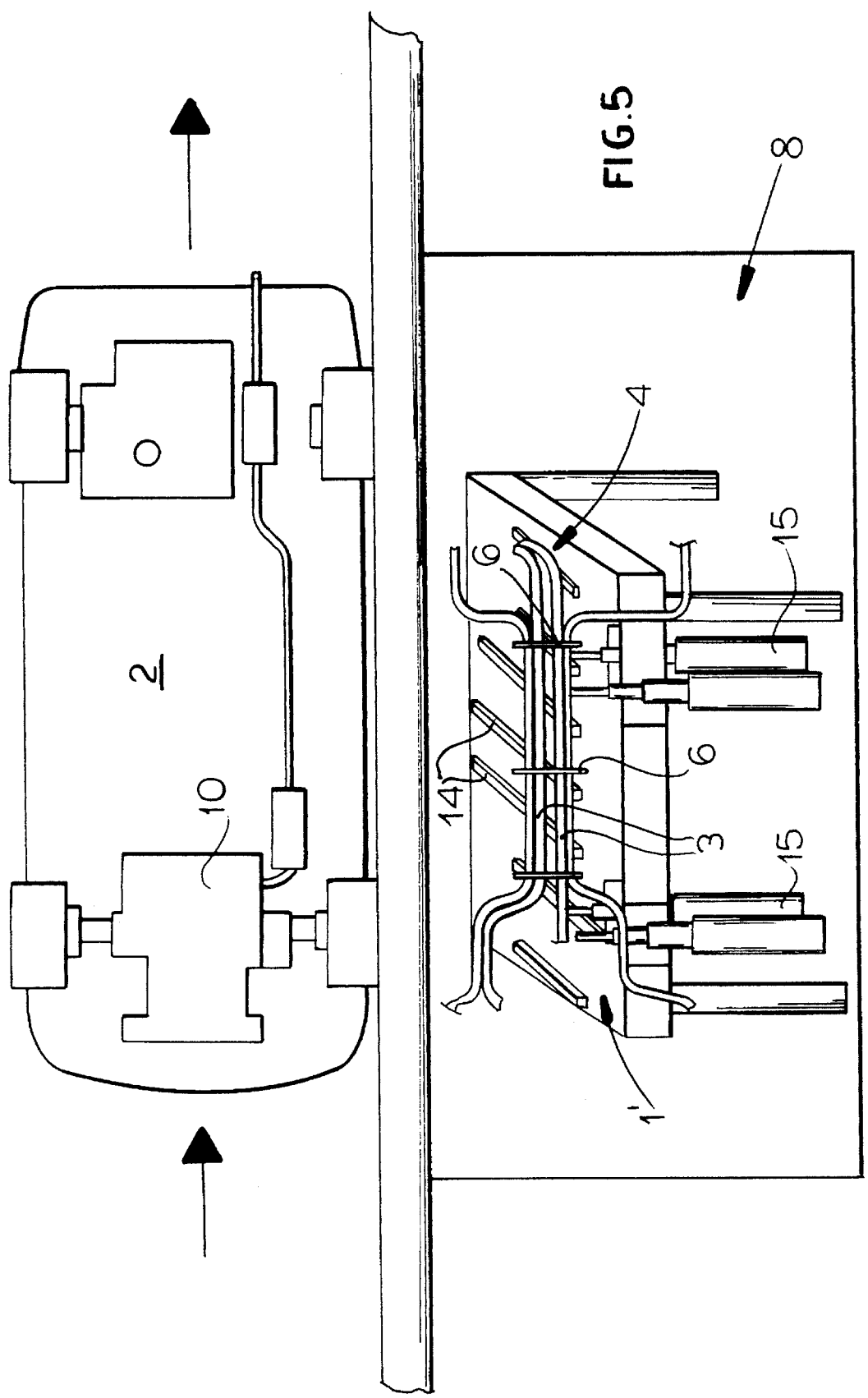
Figure 6:
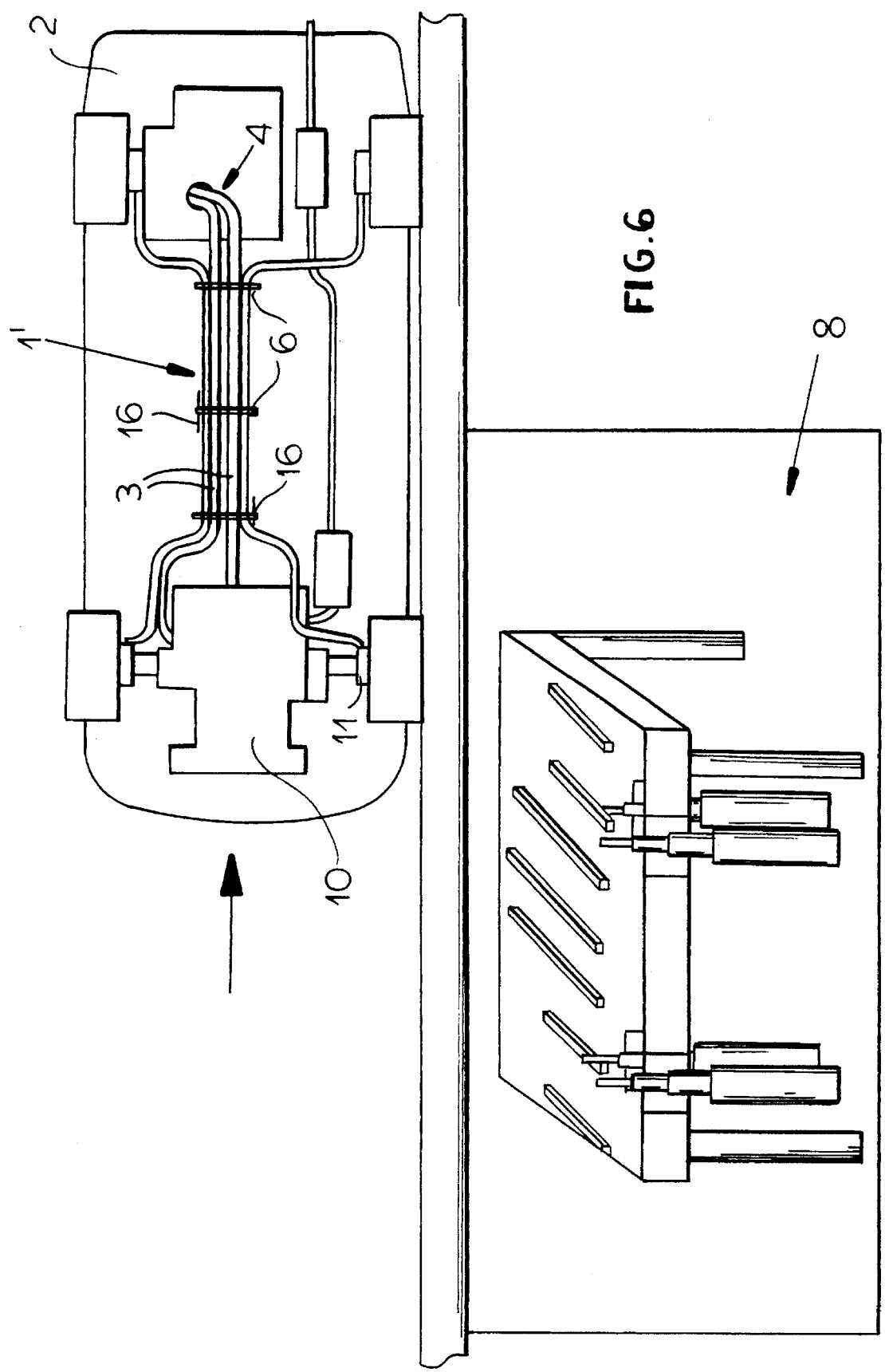

As seen in FIG. 1 a tube assembly 1 according to the invention comprises a plurality, here five, of perfectly straight tubes 3a–3e provided at their ends with various fittings 5a–5e which are adapted to be fitted to various fluid-using elements of a motor vehicle 2 (FIGS. 4–6 where for clarity of view the tube assembly 1 is shown with fewer components than in FIG. 1), such as for instance the gas tank 9, engine 10, and wheel brakes 11. When installed as shown in FIG. 6 the tubes 3a–3e must be bent as indicated at 4 to fit the vehicle 2. The tubes 3a–3e are held together by transverse clips or cleats 6 that the tubes 3a–3e pass through and that are formed with holes 12 subsequently used to secure the assembly 1 to the vehicle 2. These cleats 6 can be stiff metal or plastic strips formed with throughgoing holes through which the tubes 3a–3e pass. In the assembly 1 the axes of the tubes 3a–3e are all parallel and coplanar so that it is possible to stack up a plurality of the assemblies 1, making them very easy to ship and handle. In addition three the tubes 3a–3e are made of metal and very rigid so that even if the other tubes 3a–3e are of relatively flexible plastic, the assembly 1 will be relatively stiff and easy to handle.

According to the invention as illustrated in FIGS. 2a through 3e, at least the tube 3c is made of an elastically deformable plastic and is supposed to be formed with a bend at 7. To allow this a short sleeve 9 of soft-metal tubing is fitted over (FIGS. 2a–2e) or inserted into (FIGS. 3a–3e) the tube 3c at this location 7. Thus when the tube 3c is bent at the location 7, the sleeve 9 will deform plastically and retain the elastically deformed tube 3c in the desired bent shape. The sleeve 9 is split so it can be fitted over the tube 3c and bent inward or fitted inside it and expanded outward to fit snugly.

Figure 4:
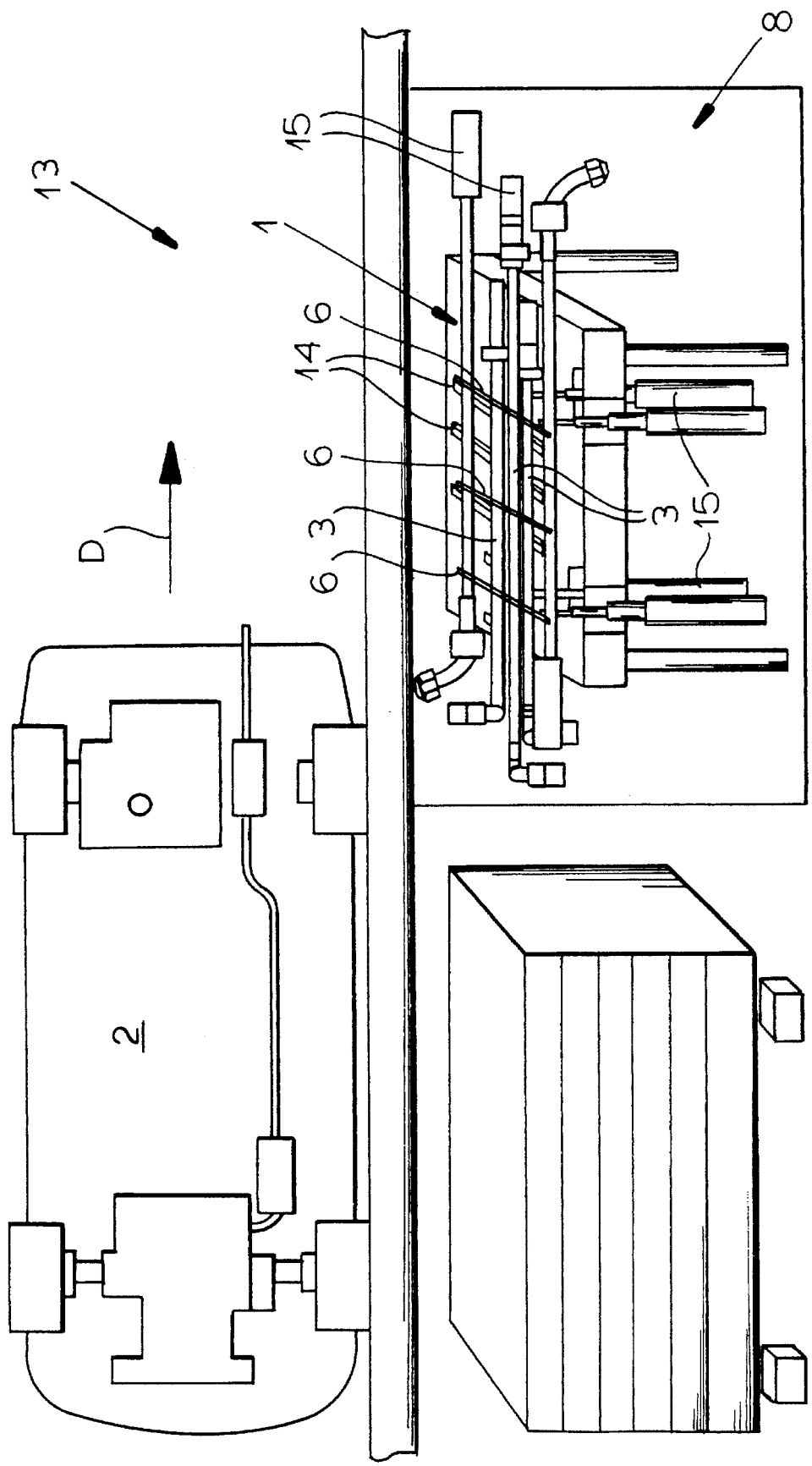
FIGS. 4, 5, and 6 are mainly schematic views illustrating the installation of the tube assembly according to the invention in a motor vehicle.

FIG. 4 shows how the vehicle 2 is moved in a longitudinal direction D past a tube-installing station 13 provided with a bending apparatus 8. The flat assembly 1 is laid on the table 1 which is provided with a holder 14 that the assembly 1 fits to, and benders 15 are actuated as shown in FIG. 5 to impart the desired bends to the various tubes 3a–3e. Then as illustrated in FIG. 6 the bent assembly 1' is secured to the motor vehicle 2 and to the elements 9, 10, 11 thereof by means of the end fittings 5a–5e. Then fasteners such as illustrated at 16 are secured to the holes 12 in the cleats 6 and other clips or fasteners are secured directly to the tubes 3a–3e to mount the finished assembly 1' solidly in the vehicle 2.

I claim:

1. In a method of manufacturing a motor vehicle having fluid-using elements where the vehicle is moved as it is being made past a station, the improvement comprising the steps of:

delivering to the station an assembly having a plurality of substantially straight and longitudinally extending tubes having ends, respective fittings on the ends adapted to be secured to the elements of the vehicle, and transverse cleats laterally interconnecting the tubes into the assembly;

plastically bending at least some of the tubes at the assembly station;

fitting the assembly with the bent tubes to the vehicle at the station;

securing the fittings to the respective elements; and fastening at least one of the cleats to the vehicle.

2. The improved motor-vehicle manufacturing method defined in claim 1 wherein prior to being plastically bent the tubes of the assembly are centered on substantially parallel and coplanar axes.

3. The improved motor-vehicle manufacturing method defined in claim 1 wherein one of the tubes is made of elastically deformable plastic and is provided at a bend location with a sleeve of plastically deformable metal that is subsequently plastically bent.

4. The improved motor-vehicle manufacturing method defined in claim 3 wherein the sleeve is mounted outside the one tube.

5. The improved motor-vehicle manufacturing method defined in claim 3 wherein the sleeve is mounted inside the one tube.

6. The improved motor-vehicle manufacturing method defined in claim 1 wherein at least one of the tubes is made of metal and is rigid.

* * * * *